(12) United States Patent
McNeish

(10) Patent No.: US 9,448,107 B2
(45) Date of Patent: Sep. 20, 2016

(54) PANORAMIC LASER WARNING RECEIVER FOR DETERMINING ANGLE OF ARRIVAL OF LASER LIGHT BASED ON INTENSITY

(71) Applicant: BAE Systems Information and Electronic Systems Integration Inc., Nashua, NH (US)

(72) Inventor: Allister McNeish, Austin, TX (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 701 days.

(21) Appl. No.: 13/939,711

(22) Filed: Jul. 11, 2013

(65) Prior Publication Data

US 2016/0209266 A1    Jul. 21, 2016

Related U.S. Application Data

(60) Provisional application No. 61/670,740, filed on Jul. 12, 2012.

(51) Int. Cl.
*G01S 13/66* (2006.01)
*G01J 1/42* (2006.01)

(52) U.S. Cl.
CPC .................................. *G01J 1/4257* (2013.01)

(58) Field of Classification Search
CPC ................. G01S 13/66; G01S 7/4811; G01S 2013/936; G03B 37/00; G03B 35/00
USPC ........... 250/214.1, 216, 208.1, 201.1–201.4, 250/203.1–203.6; 356/141.2–141.5; 342/14, 15, 20, 66; 244/3.16, 3.17
See application file for complete search history.

(56) References Cited

U.S. PATENT DOCUMENTS

| | | | |
|---|---|---|---|
| 4,908,705 A | 3/1990 | Wight | |
| 7,075,048 B2 | 7/2006 | Gal et al. | |
| 7,492,308 B2 * | 2/2009 | Benayahu | F41H 7/00 244/3.1 |
| 2004/0104334 A1 | 6/2004 | Gal et al. | |

FOREIGN PATENT DOCUMENTS

| | | |
|---|---|---|
| JP | 60-084539 | 10/1983 |
| JP | 10-123422 | 10/1996 |
| JP | 2005148265 | 11/2003 |

* cited by examiner

*Primary Examiner* — Que T Le
(74) *Attorney, Agent, or Firm* — Daniel J. Long

(57) ABSTRACT

A method and apparatus of detecting laser in a laser warning receiver is disclosed. A panoramic lens assembly utilized in cameras is combined with a laser detection focal plane. Incident laser light is refracted in the panoramic lens and made to illuminate a multiplicity of individual sensor elements. By determining the corresponding intensity of the laser light on the sensors, the angle of arrival resolutions superior to the element angular resolutions can be achieved. The combination of a panoramic lens with a laser detection focal plane provides a low cost laser warning for wrap around ground based situational awareness.

10 Claims, 5 Drawing Sheets

(12)	United States Patent	US 9,448,107 B2

PANORAMIC LASER WARNING RECEIVER FOR DETERMINING ANGLE OF ARRIVAL OF LASER LIGHT BASED ON INTENSITY

CROSS-REFERENCE TO RELATED APPLICATIONS

This application claims rights under 35 USC §119(e) from U.S. Application Ser. No. 61/670,740 filed 12-Jul.-2012, the contents of which are incorporated herein by reference.

TECHNICAL FIELD

Embodiments are generally related to laser detection systems. Embodiments are also related to Laser Warning Receivers (LWRs) in the field of military defense. Embodiments are additionally related to system and method of determining angle of arrival of laser in LWR.

BACKGROUND OF THE INVENTION

A Laser Warning Receivers (LWRs) is a type of warning system used as a passive military defense. It detects laser emission from laser guidance systems and laser rangefinders. Then it alerts the crew and can start various countermeasures, like smoke screen, aerosol screen, active Laser Self-Defense Weapon (LSDW) with Laser dazzler, laser jammer, etc.

A method for determining azimuth and elevation angles of a radiation source or other physical objects located anywhere within an cylindrical field of view is disclosed in U.S. Pat. No. 7,075,048 issued to Gal et al. The method makes use of an omni-directional imaging system comprising of reflective surfaces, an image sensor and an optional optical filter for filtration of the desired wavelengths. The imaging system is designed to view an omni-directional field of view using a single image sensor and with no need for mechanical scan for coverage of the full field of view. Use of two such systems separated by a known distance, each providing a different reading of azimuth and elevation angle of the same object, enables classic triangulation for determination of the actual location of the object. This prior art refers specifically to the design and use of reflective surfaces to achieve a panoramic omni-directional radiation source locator.

In another prior art, AN/AAR-47 Missile Approach Warning System (MAWS) employed on helicopters and transport aircraft is disclosed. The system warns of threat missile approach by detecting radiation associated with the rocket motor and automatically initiates flare ejection. The AN/AAR-47 is a passive Electro-Optic Missile Warning System designed to provide warning of Surface to Air Missiles (SAMS) and pass information to countermeasures systems. Employed on helicopters and transport aircraft, the AAR-47 Missile Approach Warning System (MAWS) warns of threat missile approach, enabling the effective employment of evasive maneuvers and electronic and infrared countermeasures. Detection algorithms are used to discriminate against non-approaching radiation sources. The system consists of four sensor assemblies housed in two or more sensor domes, a central processing unit, and a control indicator. The Warning System provides attacking missile declaration and sector direction finding and will be interfaced directly to the ALE-39/47 countermeasures dispenser. Without the AAR-47, helicopters and fixed-wing aircraft have no infrared missile detection system. However, this AAR-47 comprises a distributed staring sensor which can be rather expensive.

A need, therefore, exists for a low cost, wrap-around laser' warning with one sensor to accurately determine the angle of arrival.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the present invention to provide for laser detection systems.

It is another aspect of the disclosed embodiment to provide for Laser Warning Receivers (LWRs) in the field of military defense.

It is a further aspect of the disclosed embodiment to provide a system and method of determining angle of arrival of laser in laser warning receiver.

The aforementioned aspects and other objectives and advantages can now be achieved as described herein. A method and apparatus of detecting laser in a laser warning receiver is disclosed. A panoramic lens assembly utilized in cameras is combined with a laser detection focal plane. Incident laser light is refracted in the panoramic lens and made to illuminate a multiplicity of individual sensor elements. By determining the corresponding intensity of the laser light on the sensors, the angle of arrival resolutions superior to the element angular resolutions can be achieved. The combination of a panoramic lens with a laser detection focal plane provides a low cost laser warning for wrap around ground based situational awareness.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

The present invention determines angle of arrival of laser light from, for example a laser guided missile by combining a panoramic lens assembly utilized in cameras with a laser detection focal plane. The focal plane and the panoramic lens create a single-sensor, low cost LWR that accurately determines angle of arrival.

Figure 1:
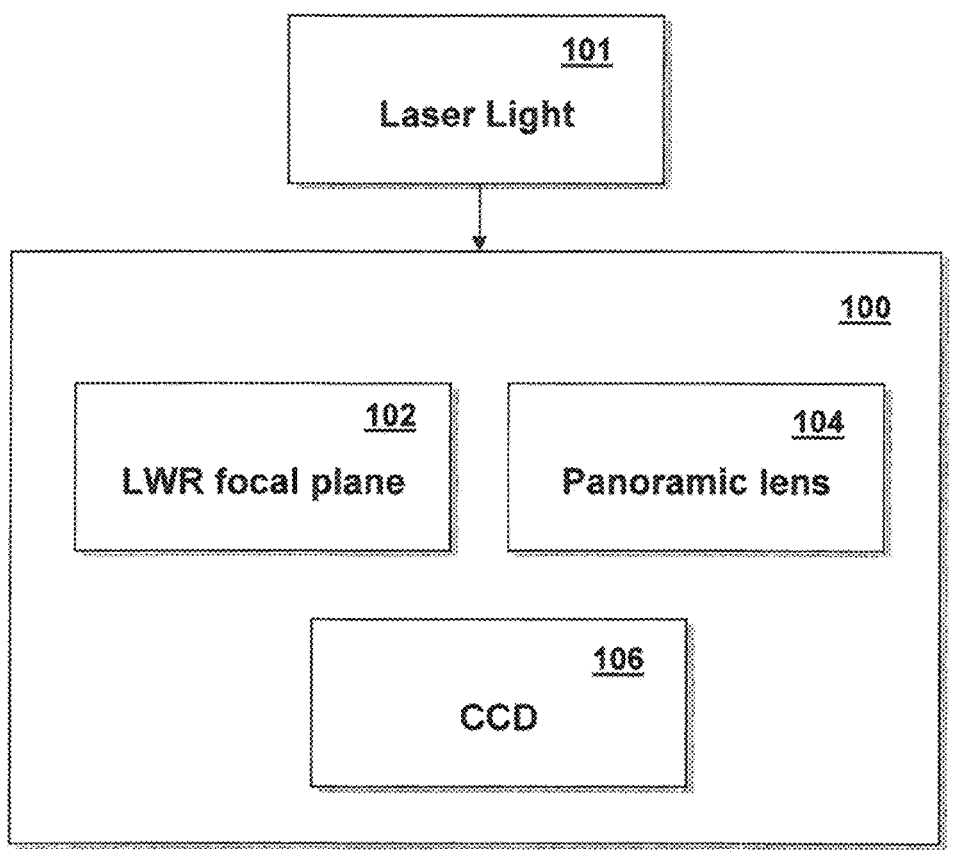
FIG. 1 illustrates a block diagram of a panoramic laser warning receiver, in accordance with the disclosed embodiments.

Referring to FIG. 1, a panoramic Laser Warning Receiver (LWR) 100 is disclosed. A panoramic 360° lens 104 is combined with a focal plane 102 of the LWR 100 to accurately determine the angle of arrival of the laser light 101. Incident laser light 101 for example from a laser guided missile pass through the focal plane 102 and is refracted in the lens 104. Then the refracted laser light 101 is send to a Charge Coupled Device (CCD) 106 which converts the laser light to a sequence of voltages proportional to intensity laser light. The intensity of the laser light is determined from the sequence of voltages from CCD 106. The angle of arrival resolutions superior to the element angular resolutions can be achieved from determined intensity of the laser light 101.

Figure 2:
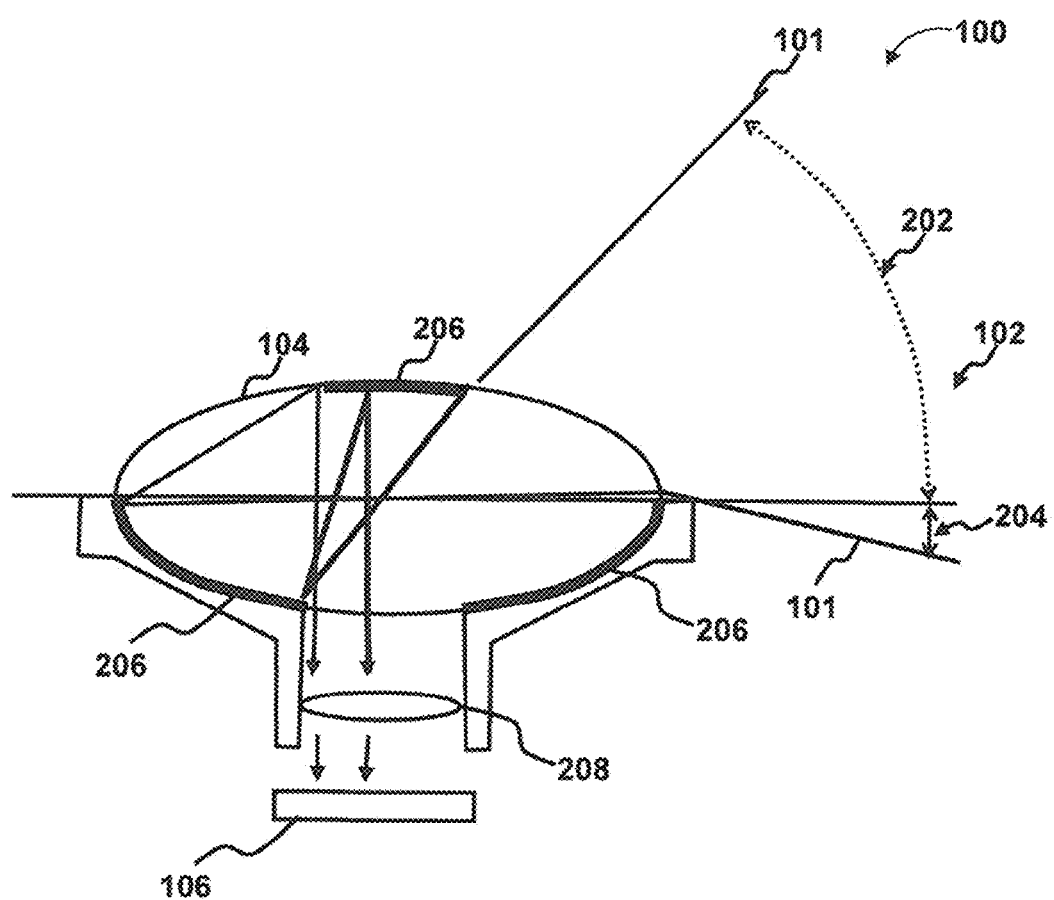
FIG. 2 illustrates a schematic diagram of the panoramic laser warning receiver depicted in FIG. 1, in accordance with the disclosed embodiments.

FIG. 2 illustrates a schematic diagram of the panoramic laser warning receiver 100 depicted in FIG. 1, in accordance with the disclosed embodiments. The panoramic 360° lens 104 is combined with a focal plane 102 to create an angle of view up to 70° above the horizon represented by reference numeral 202 and up to 17° below the horizon represented by reference numeral 204. Incident laser light 101 is refracted in the lens 104 and sends a signal to the charge coupled device 106 through a relay lens 208. The reflective portions of the lens 104 are represented by reference numeral 206. Note that in addition to the CCD 106, many other sensors can also be used.

Figure 3:
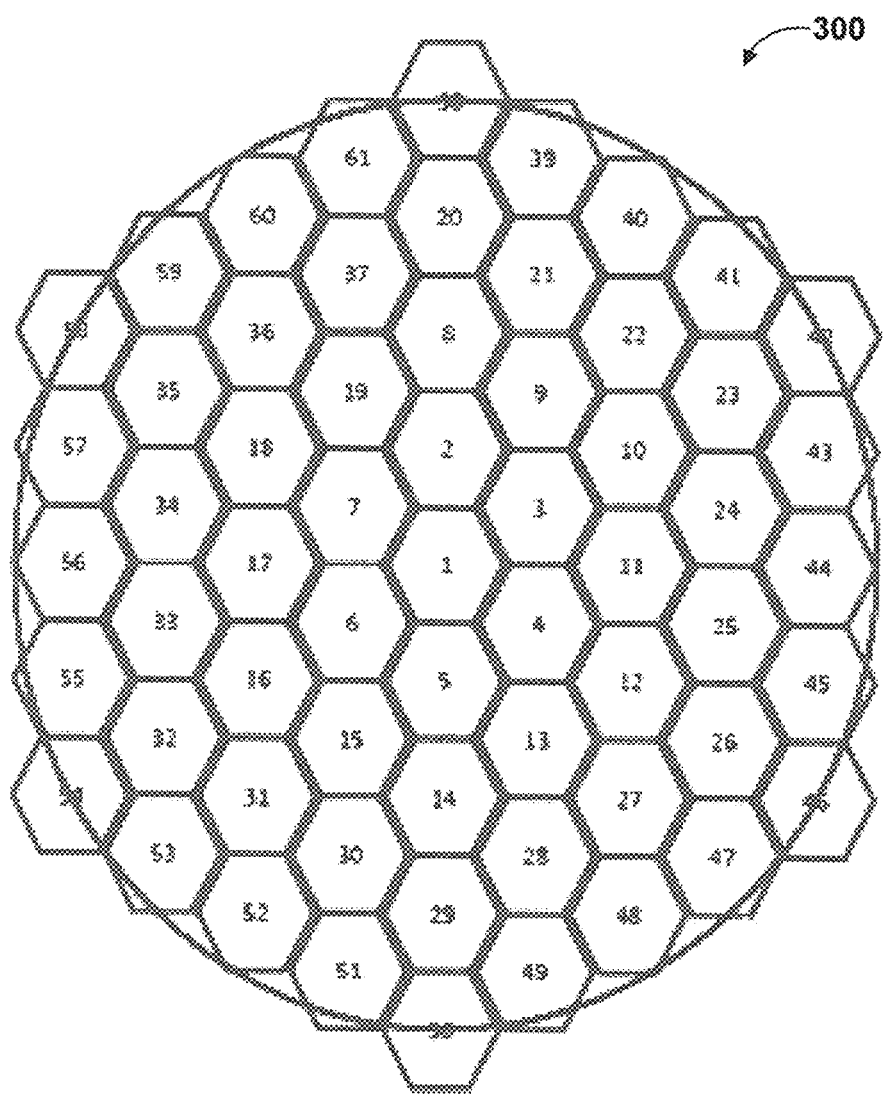
FIG. 3 illustrates a schematic diagram of a multi-element hexagonal avalanche photodiode array, in accordance with the disclosed embodiments.

Referring to FIG. 3, a schematic diagram of a multi-element hexagonal avalanche photodiode array 300 utilized in the Laser Warning Receiver (LWR) 100 of FIG. 1 is depicted. Note that the multi-element devices such as this could be sampled either individually in parallel, or in sequence using a read-out integrated circuit (ROIC), or some other combination of the two approaches that would use multiple ROICs operating in parallel.

In general, a multichannel array photodetectors consist of a number of single element photodiodes laid adjacent to each other forming a one-dimensional sensing area common cathode substrate. They can perform simultaneous measurements of a moving beam or beams of many wavelengths. They feature low electrical cross talk and super high uniformity between adjacent elements allowing very high precision measurements.

Figure 4:
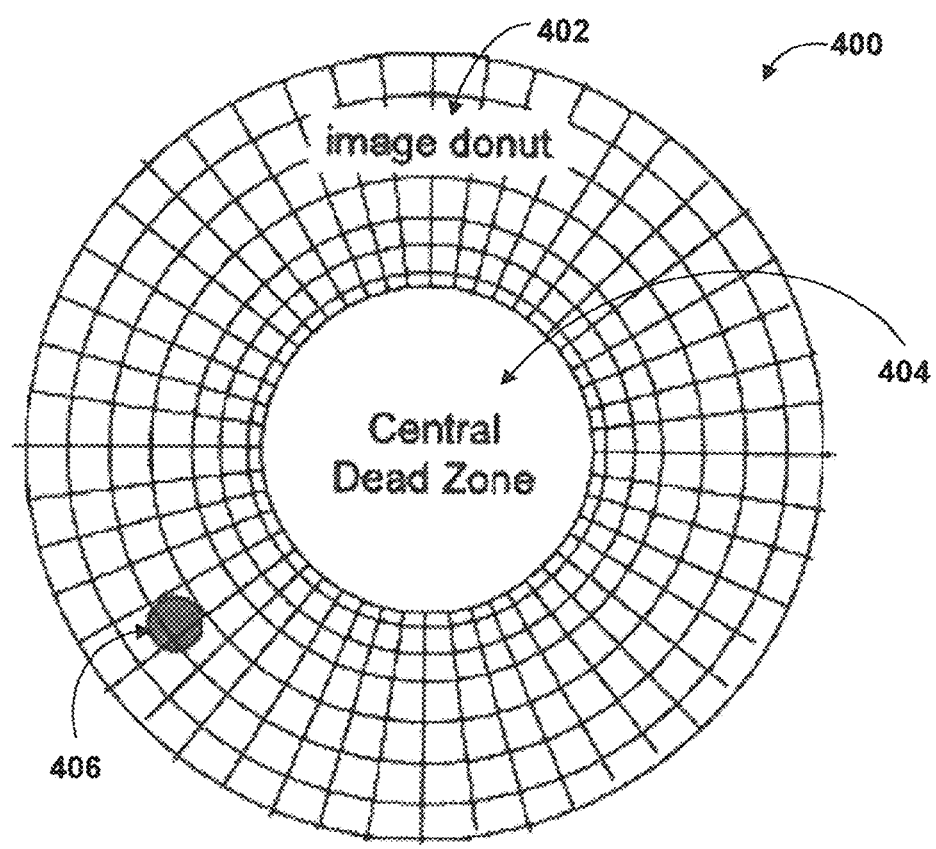
FIG. 4 illustrates a schematic diagram of a LWR Focal Plane Mosaic from the panoramic laser warning receiver depicted in FIG. 1, in accordance with the disclosed embodiments.

FIG. 4 illustrates a schematic diagram of a LWR Focal Plane Mosaic 400 from the panoramic laser warning receiver 100 depicted in FIG. 1, in accordance with the disclosed embodiments. The angle of view described in FIG. 4 is revolved around a central zone to create a 360°×87° detection range. When incident laser light enters the detection range, the laser light can be made to illuminate a multiplicity of individual sensor elements. By determining the corresponding intensity of the laser light on these sensors, the angle of arrival resolutions superior to the element angular resolutions can be achieved. The image donut, central dead zone and laser light are represented by reference numeral 402, 404 and 406 respectively.

Figure 5:
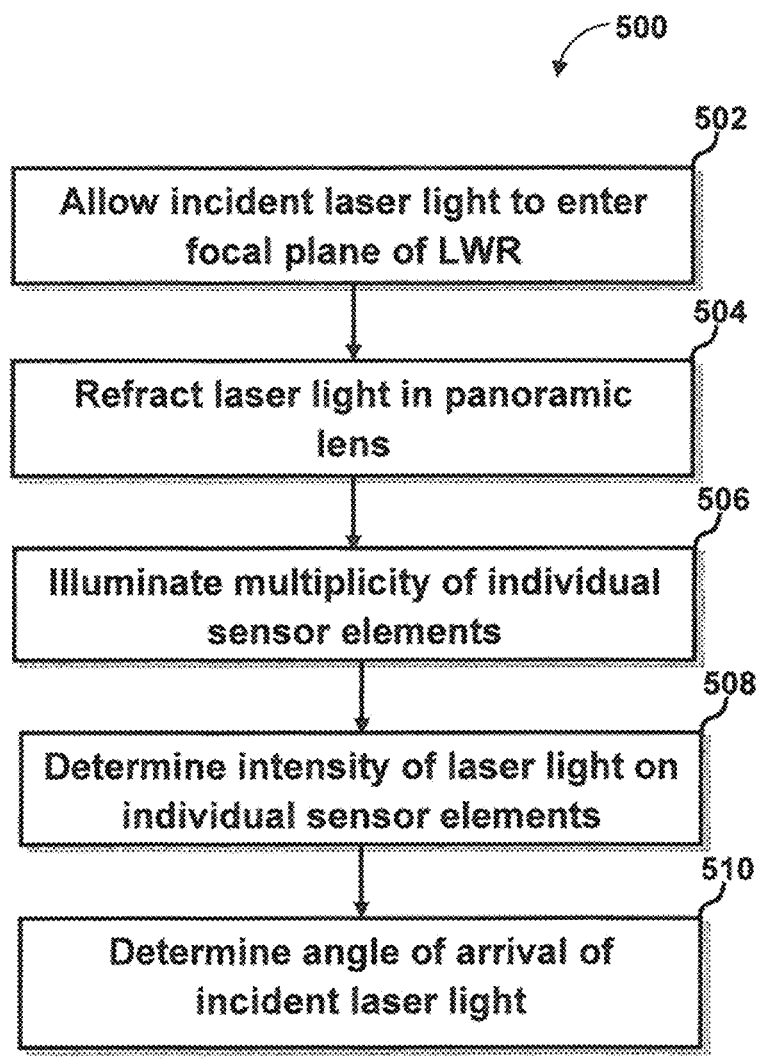
FIG. 5 illustrates a flow chart depicting the process of determining angle of arrival of laser by utilizing the panoramic laser warning receiver depicted in FIG. 1 in accordance with the disclosed embodiments.

Referring to FIG. 5, a flow chart 500 illustrating the process of determining angle of arrival of laser by utilizing the panoramic laser warning receiver 100 of FIG. 1 is depicted. As said at block 502, the incident laser light from for example a laser guided missile is allowed to enter focal plane of LWR. Then the laser light gets refracted on refracting portions of the panoramic lens as illustrated at block 504. A CCD and/or a multiplicity of individual sensor elements is illuminated and the intensity of laser light on individual sensor elements are determined as depicted at block 506 and 508. Finally, as said at block 510, the angel of arrival of incident laser light is determined to launch an appropriate countermeasure.

The combination of focal plane of LWR and panoramic lens offers the capability of producing a low cost laser warning solution for wrap around ground based situational awareness. Note that the laser focal plane shown in FIG. 2 can be replaced in initial studies by a camera focal plane, but would need a custom built design that is well within the capabilities of applicant's micro-electronic foundries.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining angle of arrival of laser light, comprising coupling a panoramic camera lens with a radial element laser warning receiver focal plane;
    illuminating at least one sensor utilized for determining intensity of said laser light; and
    determining angle of arrival of said laser light based on intensity of said laser light.

2. The method of claim 1, wherein said at least one sensor is a charge coupled device.

3. The method of claim 1, wherein said least one sensor is a multi-element hexagonal avalanche photodiode array.

4. The method of claim 1, wherein said a panoramic camera lens and said focal plane provides wrap around ground based situational awareness.

5. The method of claim 1, wherein by determining intensity of the laser light on said sensor, the angle of arrival resolutions superior to the element angular resolutions is achieved.

6. An apparatus of determining angle of arrival of laser light, comprising a panoramic camera lens coupled with a radial element laser warning receiver focal plane; and
    at least one sensor illuminated to determine angle of arrival of said laser light based on intensity of said laser light.

7. The apparatus of claim 6, wherein said at least one sensor is a charge coupled device.

8. The apparatus of claim 6, wherein said at least one sensor is a multi-element hexagonal avalanche photodiode array.

9. The apparatus of claim 6, wherein said a panoramic camera lens and said focal plane provides wrap around ground based situational awareness.

10. The apparatus of claim 6, wherein by determining intensity of the laser light on said sensor, the angle of arrival resolutions superior to the element angular resolutions is achieved.

* * * * *